US011769310B2

(12) United States Patent
Ploumpis et al.

(10) Patent No.: US 11,769,310 B2
(45) Date of Patent: Sep. 26, 2023

(54) COMBINING THREE-DIMENSIONAL MORPHABLE MODELS

(71) Applicant: Huawei Technologies Co., Ltd., Shenzhen (CN)

(72) Inventors: Stylianos Ploumpis, London (GB); Stefanos Zafeiriou, London (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 121 days.

(21) Appl. No.: 17/437,269

(22) PCT Filed: Mar. 5, 2020

(86) PCT No.: PCT/GB2020/050526
§ 371 (c)(1),
(2) Date: Sep. 8, 2021

(87) PCT Pub. No.: WO2020/183130
PCT Pub. Date: Sep. 17, 2020

(65) Prior Publication Data
US 2022/0172446 A1    Jun. 2, 2022

(30) Foreign Application Priority Data

Mar. 8, 2019  (GB) ..................................... 1903125

(51) Int. Cl.
*G06T 19/20*       (2011.01)
(52) U.S. Cl.
CPC .......... *G06T 19/20* (2013.01); *G06T 2210/44* (2013.01); *G06T 2219/2021* (2013.01)

(58) Field of Classification Search
None
See application file for complete search history.

(56) References Cited

U.S. PATENT DOCUMENTS

2014/0362091 A1* 12/2014 Bouaziz ................. G06T 7/292
                                                    345/473
2018/0068178 A1*  3/2018 Theobalt ............... G06T 13/40
(Continued)

FOREIGN PATENT DOCUMENTS

EP           1039417 A1     9/2000

OTHER PUBLICATIONS

Volker Blanz et al, "A Morphable Model for the Synthesis of 3D Faces," SIGGRAPH '99: Proceedings of the 26th annual conference on Computer graphics and interactive techniques, Jul. 1999, 8 pages.

(Continued)

*Primary Examiner* — Robert Bader
(74) *Attorney, Agent, or Firm* — Conley Rose, P.C.

(57) ABSTRACT

A computer implemented method of generating a new three-dimensional morphable model (3DMM) by combining a first 3DMM with a second 3DMM includes generating, using the first 3DMM, a plurality of first shapes, calculating a mapping from a plurality of second parameters of the second 3DMM to a plurality of first parameters of the first 3DMM, generating, for each of a plurality of second shapes generated using the second 3DMM, a corresponding first shape, forming a plurality of merged shapes by merging each second shape with the corresponding first shape, and performing principal component analysis on the plurality of merged shapes to generate the new 3DMM.

20 Claims, 7 Drawing Sheets

(56) References Cited

U.S. PATENT DOCUMENTS

2018/0253895 A1* 9/2018 Arumugam .......... G06V 20/647
2018/0300927 A1 10/2018 Hushchyn et al.

OTHER PUBLICATIONS

Hang Dai et al, "Augmenting a 3D morphable model of the human head with high resolution ears," Elsevier, Pattern Recognition Letters, vol. 128, Sep. 26, 2019, 7 pages.
James Booth et al, "3D Face Morphable Models "In-the-Wild"," Computer Science, Computer Vision and Pattern Recognition, Submitted on Jan. 19, 2017, 10 pages.
Stylianos Ploumpis et al, "Combining 3D Morphable Models: A Large scale Face-and-Head Model," Mar. 9, 2019, 9 pages.
Paul Koppen et al, "Gaussian mixture 3D morphable face model," Elsevier, Pattern Recognition, vol. 74, Feb. 1, 2018, 12 pages.
Marcel Luthi et al, "Gaussian Process Morphable Models," Mar. 23, 2016, 38 pages.
James Booth et al, "3D Reconstruction of "In-the-Wild" Faces in Images and Videos," Journal of Latex Class Files, vol. 14, No. 8, Aug. 2015, 14 pages.
Stylianos Ploumpis et al, "Towards a complete 3D morphable modelof the human head," IEEE Transactions on Pattern Analysis and Machine Intelligence, vol. X, No. X, Oct. 2019, 18 pages.

* cited by examiner

COMBINING THREE-DIMENSIONAL MORPHABLE MODELS

CROSS-REFERENCE TO RELATED APPLICATIONS

This is a U.S. National Stage of International Patent Application No. PCT/GB2020/050526 filed Mar. 5, 2020, which claims priority to United Kingdom Patent Application No. GB1903125.1 filed Mar. 8, 2019, both of which are hereby incorporated by reference in their entireties.

FIELD

This specification relates to generating three-dimensional morphable models (3DMMs) by combining two known three-dimensional morphable models.

BACKGROUND

Three-dimensional morphable models (3DMMs) are powerful statistical tools for representing three-dimensional surfaces of an object class. Due to their ability for inferring and representing three-dimensional surfaces, 3DMMs have many applications in computer vision, computer graphics, biometrics and medical imaging.

The creation of 3DMMs is typically labour intensive, as many registered three-dimensional scans are required for correctly training the model. Furthermore, the datasets used to generate a model may subsequently not be publically available, restricting the potential for refining a 3DMM.

SUMMARY

According to an aspect of this disclosure, there is described a computer implemented method of generating a new three-dimensional morphable model, 3DMM, by combining a first 3DMM with a second 3DMM, the method comprising: generating, using the first 3DMM, a plurality of first shapes; calculating a mapping from a plurality of second parameters of the second 3DMM to a plurality of first parameters of the first 3DMM; for each of a plurality of second shapes generated using the second 3DMM, generating a corresponding first shape; and forming a plurality of merged shapes by merging each second shape with the corresponding first shape; and performing principal component analysis on the plurality of merged shapes to generate the new 3DMM.

The first 3DMM may be configured to generate a shape for a first object and the second 3DMM is configured to generate a shape for a second object, and wherein at least a portion of the first object overlaps with at least a portion of the second object. The first object may be a full head shape and the second object may be a face or an ear. The shape generated by the second 3DMM may have a higher resolution than the shape generated by the first 3DMM.

Calculating the mapping may comprise, for each of the plurality of first shapes: determining a set of second parameters which describe a shape corresponding to at least a portion of the first shape; and determining a set of first parameters which describe the portion of the first shape. Calculating the mapping may further comprise calculating a regression matrix for mapping the plurality of sets of second parameters onto the corresponding sets of first parameters.

Calculating the regression matrix may comprise: constructing a first shape matrix comprising the plurality of sets of first parameters; constructing a second shape matrix comprising the plurality of sets of second parameters; and calculating the regression matrix by minimising:

$$\|C_h - W_{h,f} C_f\|^2$$

where $C_h$ represents the first shape matrix, $C_f$ represents the second shape matrix, and $W_{h,f}$ represents the regression matrix. Determining the set of second parameters for each first shape may comprise registering the first shape with a mean shape of the second 3DMM.

Merging each second shape with the corresponding first shape may comprise: discarding a region of the first shape corresponding to the second shape; and applying a non-rigid registration between the second shape and the first shape. Applying the non-rigid registration may comprise assigning a stiffness weight to points on the second shape based on a distance from a central point of the second shape.

According to a further aspect of this disclosure, there is described a method of generating a 3D object, the method comprising the use of the new 3DMM of any of the methods described herein.

According to a further aspect of this disclosure, there is described a computer-implemented method for generating a Gaussian process morphable model, GPMM, by combining a first three dimensional morphable model, 3DMM, with a second 3DMM, the method comprising: registering a mean shape of the first 3DMM to a mean shape of the second 3DMM and a template shape; projecting a plurality of points of the template shape onto the mean shape of the first 3DMM and/or the mean shape of the second 3DMM; determining a universal covariance matrix for the GPMM based on pairs of projected points of the template shape onto the mean shape of the first 3DMM and/or the mean shape of the second 3DMM, a covariance matrix for the first 3DMM and a covariance matrix for the second 3DMM; and defining the GPMM based on the universal covariance matrix and a predefined mean deformation.

Determining a universal covariance matrix for the GPMM may comprise: determining a local universal covariance matrix for each of the pairs of projected points based on a position of each of the projected points in the pair in the mean shape of the first 3DMM and/or the mean shape of the second 3DMM; and determining the universal covariance matrix from the local covariance matrices.

Determining a local covariance matrix for each of the pairs of projected points based on a position of each of the projected points in the pair in the mean shape of the first 3DMM and/or the mean shape of the second 3DMM may comprise, for each pair: determining if either of the projected points in the pair lies outside an overlapping region of the first 3DMM and the second 3DMM; and in response to a positive determination, determining the local universal covariance matrix based from local covariance matrices of the first 3DMM based on the positions of the projected points in the pair in the first mean shape. Determining the local universal covariance matrix may comprise taking a weighted sum of local covariance matrices, wherein weights in the weighted sum are based on the positions of the projected points in the pair in the first mean shape.

The method may further comprise: in response to a negative determination, determining the local universal covariance matrix based from local covariance matrices of the first 3DMM and the local covariance matrices of the second 3DMM based on the positions of the projected points in the pair in the first mean shape and the second mean shape. Determining the local universal covariance matrix may comprise taking a weighted sum of local covariance matrices, wherein weights in the weighted sum are based on the positions of the projected points in the pair in the first mean shape and the positions of the projected points in the pair in the second mean shape.

Projecting a plurality of points of the template shape onto the mean shape of the first 3DMM and/or the mean shape of the second 3DMM may comprise: determining, for each point, barycentric coordinates with respect to a triangle of mesh points in the first mean shape and/or second mean shape. Determining the universal covariance matrix may be based on the barycentric coordinates of each of the projected points.

The method may further comprise refining the GPMM using Gaussian process regression on a plurality of sample objects corresponding to a subject of the first 3DMM.

According to a further aspect of this disclosure, there is described a method of generating a 3D object, the method comprising the use of the GPMM generated according to any of the methods described herein.

According to a further aspect of this disclosure, there is described apparatus comprising: one or more processors; and a memory, the memory comprising computer readable instructions that, when executed by the one or more processors, cause the apparatus to perform one or more of the methods described herein.

According to a further aspect of this disclosure, there is described a computer program product comprising computer readable instructions that, when executed by a computer, cause the computer to perform one or more of the methods described herein.

BRIEF DESCRIPTION OF THE DRAWINGS

Embodiments will now be described by way of non-limiting examples with reference to the accompanying drawings, in which.

DETAILED DESCRIPTION

Generating a three-dimensional morphable model (3DMM) by combining 3DMMs that are built using different templates, have different representation capabilities and/or have been trained on different training data can result in a the generated model having a combination of desirable properties of the original 3DMMs. For example, the representation of particular regions of a model may be enhanced by combing the model with another model that specialises in modelling said regions.

However, the datasets used to generate the original 3DMMs may not be available to train a combined model. Instead, only the original 3DMMs may be available. This specification describes methods of generating 3DMMs by combining original 3DMMs without knowledge of the datasets that the original 3DMMs were trained on.

Combined 3DMMs generated using the methods described herein may enhance the "compactness" of a model when compared to the original 3DMMs with the same number of principle components retained. Compactness is defined by the variance of the training data that is explained by the model. Furthermore, the combined 3DMMs may exhibit a better generalisability than the original 3dMMs.

Figure 1:
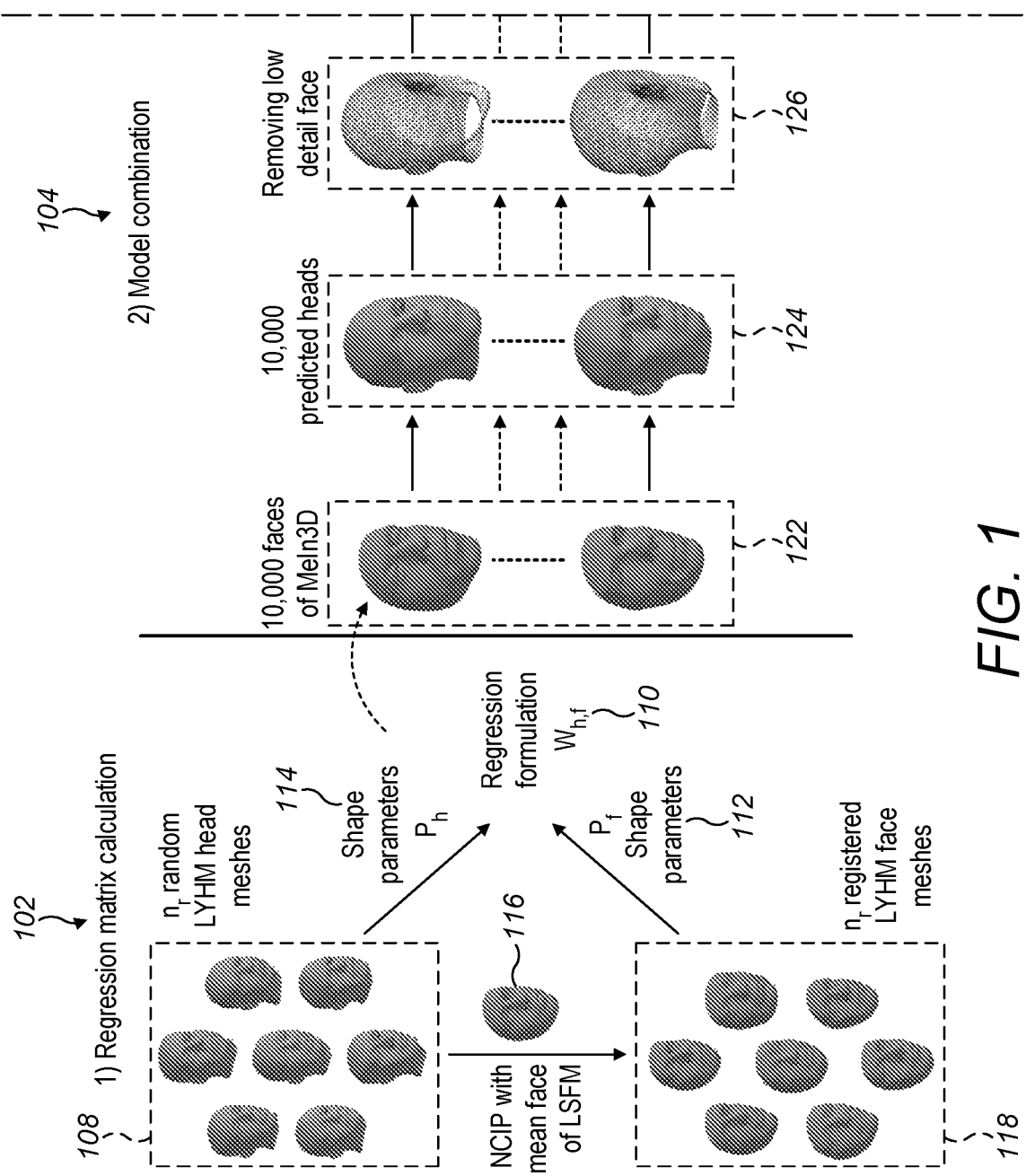
FIG. 1 shows an overview of a method of generating three-dimensional morphable models by combining two known three-dimensional morphable models.
Figure 1:
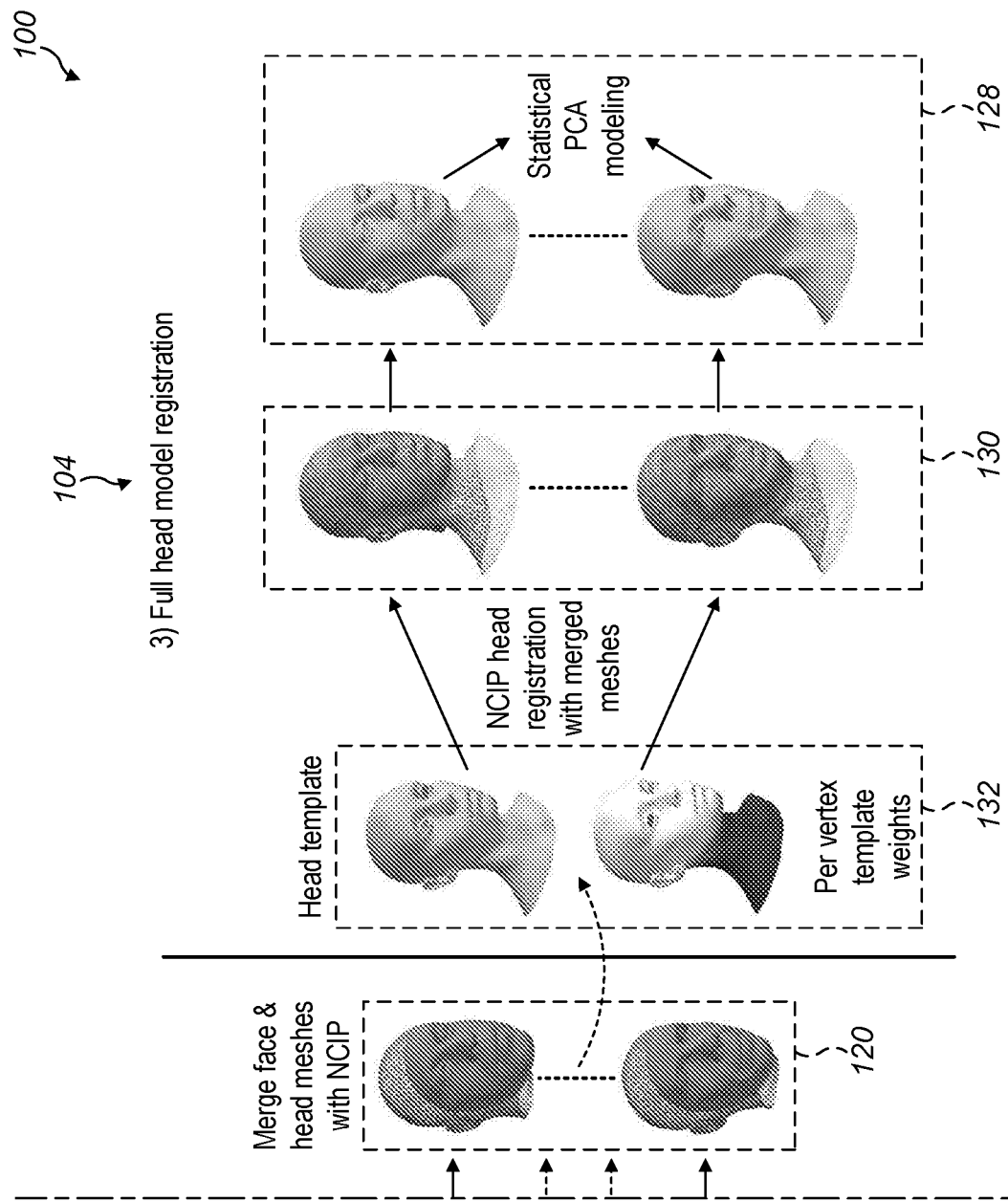

FIG. 1 shows an overview of a method for generating 3DMMs by combining two known 3DMMs. The method 100 comprises three stages: a mapping stage 102; a model combination stage 104; and a model registration stage 106. The method takes a first 3DMM and a second 3DMM generates a new 3DMM from them. The first and second 3DMM may have different properties, such as representing objects at different resolutions.

Each of the 3DMMs may represent a 3D object as a mesh, S, in three-dimensional space. The mesh comprises a plurality of points, $x_i$, in 3D space, and may be represented as an N dimensional vector, where N is the number of points in the mesh:

$$S=[x_1^T, \ldots x_N^T]^T=[x_1,y_1,z_1, \ldots x_N,y_N,z_N]^T. \quad (1)$$

The first 3DMM may generate a first mesh, $S_1$, based on a first set of parameters 114, $p_1$ (i.e. $S_1=S_1(p_1)$). The second 3DMM may generate a second mesh, $S_2$, based on a second set of parameters 112, $p_2$ (i.e. $S_2=S_2(p_2)$). The parameters of the $i^{th}$ 3DMM may be represented as an $n_i$ component vector:

$$p_i=[pi_1, \ldots pi_{ni}] \quad (2)$$

In general, the number of points in the first and second mesh need not be equal (i.e. in some embodiments, $N_1$ is not equal to $N_2$, where $N_i$ is the number of points in the mesh output by the $i^{th}$ model). The first and second 3DMM may also each use a different number of parameters (i.e. in some embodiments, $p_1$ does not have the same number of components as $p_2$).

In the example shown, the first 3DMM is a full head model, described by first parameters $p_h$, and the second 3DMM is a facial model, described by second parameters $p_f$. However, it will be appreciated that the method can equally be applied to any types of 3DMMs that at least partially overlap. The first 3DMM may correspond to an object of a particular class (e.g. a head), with the second 3DMM correspond to a feature of objects of that class (e.g. a face, a facial feature, an ear).

In the mapping stage 102, a plurality of shapes 108 are generated using the first 3DMM. These shapes 108 may be referred to herein as "first shapes". The plurality of shapes may be generated randomly from the first model using a predetermined distribution, such as a Gaussian distribution. A mapping from the second model to the first model is then determined using the plurality of first shapes 108 and properties of the second model. The mapping 110 comprises a mapping from a plurality of parameters of the second model 112 (herein referred to as "second parameters") to a plurality of parameters of the first model 114 (herein referred to as "first parameters"), and/or vice versa. In some embodiments, a reference shape 116 of the second model, such as the mean shape, may be registered with each of the plurality of first shapes in order to generate, for each of the plurality of first shapes, a set of second parameters that represent said first shape (i.e. represent the region in which the first 3DMM and second 3DMM overlap). These sets of second parameters 112 represent a plurality of shapes of the second model 118 that each correspond to one of the plurality of first shapes 108. The sets of second parameters 112 and sets of first parameters 114 are compared to determine the mapping.

In the model combination stage 104, the determined mapping is used to form a plurality of merged shapes 120 from a plurality of shapes generated from the second model 122 (herein referred to as "second shapes"). For each of the second shapes 122 (e.g. faces), a corresponding first shape 124 (e.g. full head) is generated using the mapping determined in the first stage. Each of the generated first shapes is then merged with the corresponding second shape to generate the merged shape 120.

In some embodiments, the merging comprises, for each of these generated first shapes 124, removing one or more regions corresponding to the second shape used to generate said first shape to generate a partial/reduced shape 126. Each second shape is then registered to the corresponding partial/reduced shape 126 to create the merged shapes 120.

In the model registration stage 106 the plurality of merged shapes 120 are used to generate a new 3DMM. Principal component analysis 128 may be used on the plurality of merged shapes to determine the merged 3DMM.

In some embodiments, the model registration stage 106 also comprises registering 130 each of the merged shapes 120 to a reference template 132 prior to performing principal component analysis 128 on the merged shapes. This can reduce distortions of the merged shapes 120 that arise during the model combination stage 104. For example, when combing a head shape 3DMM with a face shape 3DMM, the neck of the merged heads may be deformed during the model combination stage 104, and registering the merged heads to a head template may result in the merged 3DMM more accurately representing the neck area.

Figure 2:
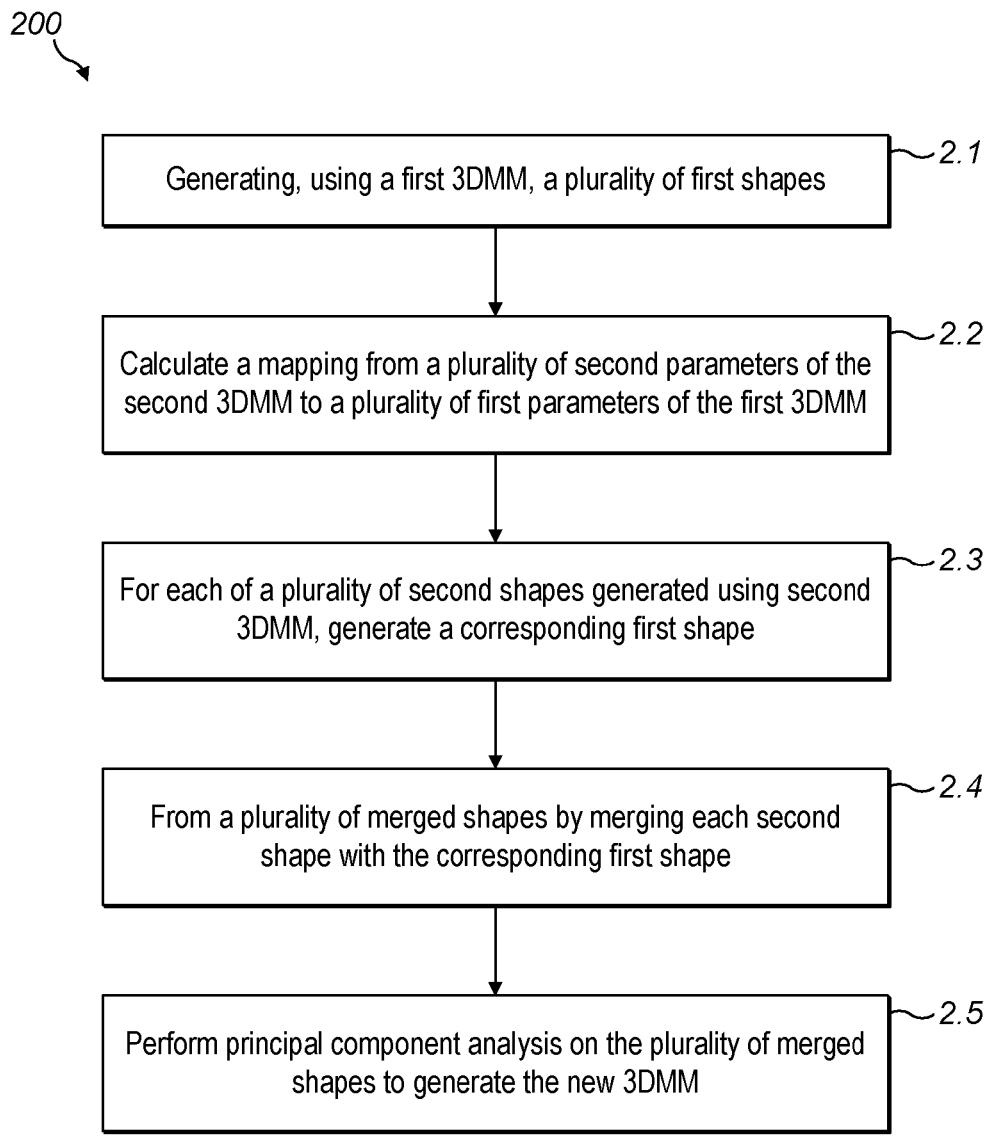
FIG. 2 shows a flow diagram of an example method of generating three-dimensional morphable models by combining two known three-dimensional morphable models.

FIG. 2 shows a flow diagram of an example method for generating three-dimensional morphable models by combining two known three-dimensional morphable models. The method 200 may be implemented on a computer. The method 200 generates a new 3DMM by combining a first 3DMM with a second 3DMM.

At operation 2.1, a plurality, n of first shapes 108 is generated using a first 3DMM. The plurality of first shapes 108 may be generated randomly from the first model using a predetermined distribution, such as a Gaussian distribution.

The first 3DMM may be a principle component analysis generative model with $N_1$ points in a mesh, $S_1$. The first 3DMM may be described using an orthonormal basis formed from a plurality of the principle components of the model. In some embodiments, the first $n_1$ principle components, $U_1 \in \mathbb{R}^{2N_1 \times n_1}$, corresponding to the $n_1$ eigenvalues with the greatest magnitude are taken to form the basis. The number of eigenvalues used, $n_1$, may, in some embodiments, be greater than 20. For example, it may lie in the range 20 to 60 components. The first 3DMM may then generate the first shape using:

$$S_1(p_1) = m_1 + U_1 p_1 \quad (3)$$

where $m_1$ is a first reference shape. An example of a first reference shape is the mean shape of the first model, though other reference shapes may alternatively be used. It will be appreciated that this example is not the only type of first 3DMM that may be used.

The plurality of first shapes 108 may be generated from the first 3DMM by synthesizing data from the latent Eigen-space of the first 3DMM by drawing samples from a pre-defined statistical distribution. For example, the plurality of first shapes 108 may be generated by sampling the first 3DMM using a Gaussian distribution defined by the principle eigenvalues of the first 3DMM. The standard deviations of the distribution may be based on the eigenvalues of the corresponding eigenvectors for each parameter. For example, the standard deviations may be equal to the square root of the eigenvalue. Other statistical distributions may alternatively be used.

A total number of $n_r$ first shapes may be generated to form the plurality of first shapes 108.

In embodiments relating to combining head and face 3DMMs, the first 3DMM may be a head shape model that models the shape of a head. The shape of the head may comprise a cranial shape. The head shape model may additionally comprise facial details (i.e. be a craniofacial head model). An example of such a head shape model is the Liverpool York Head Model (LYHM). In this model, the facial region is described at the same spatial resolution as the rest of the cranium.

At operation 2.2, a mapping from a plurality of second parameters, $p_2$, of the second 3DMM to a plurality of first parameters, $p_1$, of the first 3DMM is determined. A reference shape 116 of the second model, such as the mean shape, may be registered with each of the plurality of first shapes generated at operation 2.1 in order to generate, for each of the plurality of first shapes, a set of second parameters that represent said first shape. In some embodiments, parameters of the second 3DMM, $p_2$, are found that which describe a shape corresponding to at least a portion of the first shape and a set of first parameters which describe the portion of the first shape are determined.

The second parameters may be determined by registering the first shapes 108 with a reference shape 116 of the second model, such as the mean shape. The registration may, for example, be performed using non-rigid registration, such as Non-rigid Iterative Closest Point (NICP) registration. After each of the first shapes 108 is registered to the reference shape 116, the parts of the first shapes 108 that correspond to the second 3DMM are determined (e.g. the overlapping parts of the first and second 3DMM). These corresponding parts of the first shapes 108 are projected onto the sub-space of the second model to determine the corresponding second parameters, $p_2$.

Thus, for each of the first shapes 108 there are a pair of sets of parameters, $(p_1, p_2)$ corresponding to the first 3DMM and the second 3DMM. In some embodiments, the first element of the pair corresponds to an object of the first 3DMM, while the second element of the pair corresponds to a feature of the object that is generated by the second 3DMM. For example, the pair $(p_1, p_2)$ may correspond to a full head representation and a facial representation respectively.

For example, in embodiments where the first 3DMM is a full head model and the second 3DMM is facial model, the facial region of each full head of the first shapes 108 is used to determine parameters of the facial model that encode that face.

In some embodiments, the second 3DMM may be a principle component analysis generative model with $N_2$ points in a mesh, $S_2$. The second 3DMM may be described using an orthonormal basis formed from a plurality of the principle components of the model. In some embodiments, the first $n_2$ principle components, $U_2 \in \mathbb{R}^{2N_2 \times n_2}$, corresponding to the $n_2$ eigenvalues with the greatest magnitude are taken to form the basis. The number of principle components used, $n_2$, may, in some embodiments, be greater than 20. For example, it may lie in the range 20 to 60 components. The second 3DMM may then generate second shapes using:

$$S_2(p_2) = m_2 + U_2 p_2 \quad (4)$$

where $m_2$ is a second reference shape. An example of a second reference shape is the mean shape of the second model, though other reference shapes may alternatively be used. It will be appreciated that this example is not the only type of second 3DMM that may be used.

The second 3DMM may comprise a feature model that generates models of features that at least partially overlap with the models generated by the first 3DMM. In embodiments relating to combining head and face 3DMMs, the second 3DMM may be a facial model/a facial feature model that models one or more sub-features of a face (such as, for example, a nose, an eye, an ear and/or a mouth). An example of such a head shape model is the Large Scale Facial Model (LSFM). This model incorporates bespoke models in terms of age, gender and ethnicity.

Following determination of the corresponding pairs of parameter sets, a mapping is determined from $p_1$ to $p_2$ (and/or vice versa). In some embodiments, determining the mapping comprises calculating a regression matrix for mapping the plurality of sets of second parameters onto the corresponding sets of first parameters.

In some embodiments, a first matrix $C_1 \in \mathbb{R}^{n_1 \times n_r}$, may be constructed comprising all the parameters, $p_1$, of the first shapes 108 in the first 3DMM. A corresponding second matrix $C_2 \in \mathbb{R}^{n_2 \times n_r}$, may be constructed comprising all the corresponding parameters, $p_2$, of the first shapes 108 in the second 3DMM. A weight matrix, $W_{1,2} \in \mathbb{R}^{n_1 \times n_2}$, is determined using these two matrices that describes the mapping between the parameters of the first 3DMM and the parameters of the second 3DMM.

For example, the problem of finding the weight matrix may be formulated as a least squares problem that minimises the objective function:

$$\|C_1 - W_{1,2} C_2\|^2 \quad (5)$$

This may be solved in a number of ways. For example, by utilising the normal equation, the solution may be given by:

$$W_{1,2} = C_1 C_2^T (C_2 C_2^T)^{-1} \quad (6)$$

where $C_2^T (C_2 C_2^T)^{-1}$ is the right pseudo-inverse of $C_2$.

At operation 2.3, for each of a plurality of second shapes generated using the second 3DMM, a corresponding first shape is generated. A plurality of second shapes may be generated from the second 3DMM, for example by randomly sampling the second 3DMM. The methods used to sample the first 3DMM, described above in relation to operation 2.1, may be used to sample the second 3DMM. Alternatively, pre-existing second shapes may be used, for example taken from a database of second shapes. When using a facial 3DMM as the second 3DMM, an example of such a database is the MeIn3D database, though other databases may alternatively or additionally be used.

The mapping determined at operation 2.2 may be used to generate a first shape, $S_1'$, from each of the second shapes, $S_2'$. The weighting matrix may be used to create the generated first shape from each of the second shapes. For example, the generated first shape may be generated using:

$$S_1' = m_1 + U_1 W_{1,2} U_2^T (S_2' - m_2). \quad (7)$$

In some embodiments, the second shape is a face generated from a facial model. From the facial model, a full head model is generated using the mapping determined at operation 2.2. For example, an LSFM of a face may be used to generate a LYHM of a full head.

At operation 2.4, a plurality of merged shapes is formed by merging each second shape with the corresponding first shape. The merged shapes comprise elements of the generated first shape and elements of the second shape. The elements of the second shape may replace corresponding elements of the generated first shape.

In some embodiments, the elements of the generated first shape that correspond to the elements of the second shape are discarded from the generated first shape to produce a reduced shape (i.e. a partial first shape). For example, if the second shape is a face and the generated first shape is a full head, the facial region of the full head may be discarded.

The discarded elements of the generated first shape are then replaced with the second shape. A registration process may be used to merge the two shapes. A mesh of the first shape and a mesh of the second shape may be merged together using an NCIP framework. In order to preserve the features of the second shape while providing a smooth combination of the two meshes, deformations during registration may be restricted to the outer parts of the mesh of the second shape. This may, for example, be accomplished by introducing higher stiffness weights to the inner mesh than the outer mesh during the registration process. These weights may be computed based on a Euclidean distance from a reference point in the second mesh (e.g. the nose in a facial model). For example, the weights may be smaller for points further away from the reference point.

At operation 2.5, principal component analysis is performed on the plurality of merged shapes to generate the new 3DMM. The new 3DMM, $S_n$, with $N_n$ points in the mesh may be described by:

$$S_n(p_n) = m_n + U_n p_n \quad (8)$$

where $m_n$ is a new reference shape, $U_n \in \mathbb{R}^{2N_n \times n_n}$ is a new principle component matrix comprising the first $n_n$ principle components and $p_n$ is a vector of new parameters corresponding to the first $n_n$ principle components of the new model. An example of a new reference shape is the mean shape of the new 3DMM, though other reference shapes may alternatively be used. It will be appreciated that this example is not the only type of new 3DMM that may be used. The number of principle components used, $n_n$, may, in some embodiments, be greater than 20. For example, it may lie in the range 20 to 60 components.

Using principle component analysis on the plurality of merged shapes results in a new generative model that exhibits a combination of the properties from the first and second models.

In some embodiments, the merged shapes are each registered to a template shape before the principal component analysis is performed. Registering the merged shapes to a template may reduce inconsistencies in the merged models that arise during the model combination stage. A registration process, such as NICP, may be applied between the merged shapes and the template shape to register each merged shape to the template shape. A weighting scheme may be used in the registration process. Each point in the merged shape (and/or template shape) may be assigned a weight based on its position relative to a reference point in the shape. The reference point may, for example, be a centre of mass of the shape or a prominent feature of the shape. The weight may be assigned based on a Euclidean distance from the reference point. Additional landmarks may be added around one or more prominent features of the merged shapes and/or template shapes to preserve the shapes of those landmarks during the registration.

For example, in embodiments relating to 3DMMs of heads, weights may be assigned to the points of the merged heads based on their Euclidean distance from the centre of the head mass. This may reduce any inconsistencies of, for example, the neck area that might appear from the regression scheme. For the area around the ear, an additional set of landmarks are introduced, such as an additional fifty landmarks, to control the registration and preserve the general shape of the ear area.

Figure 3:
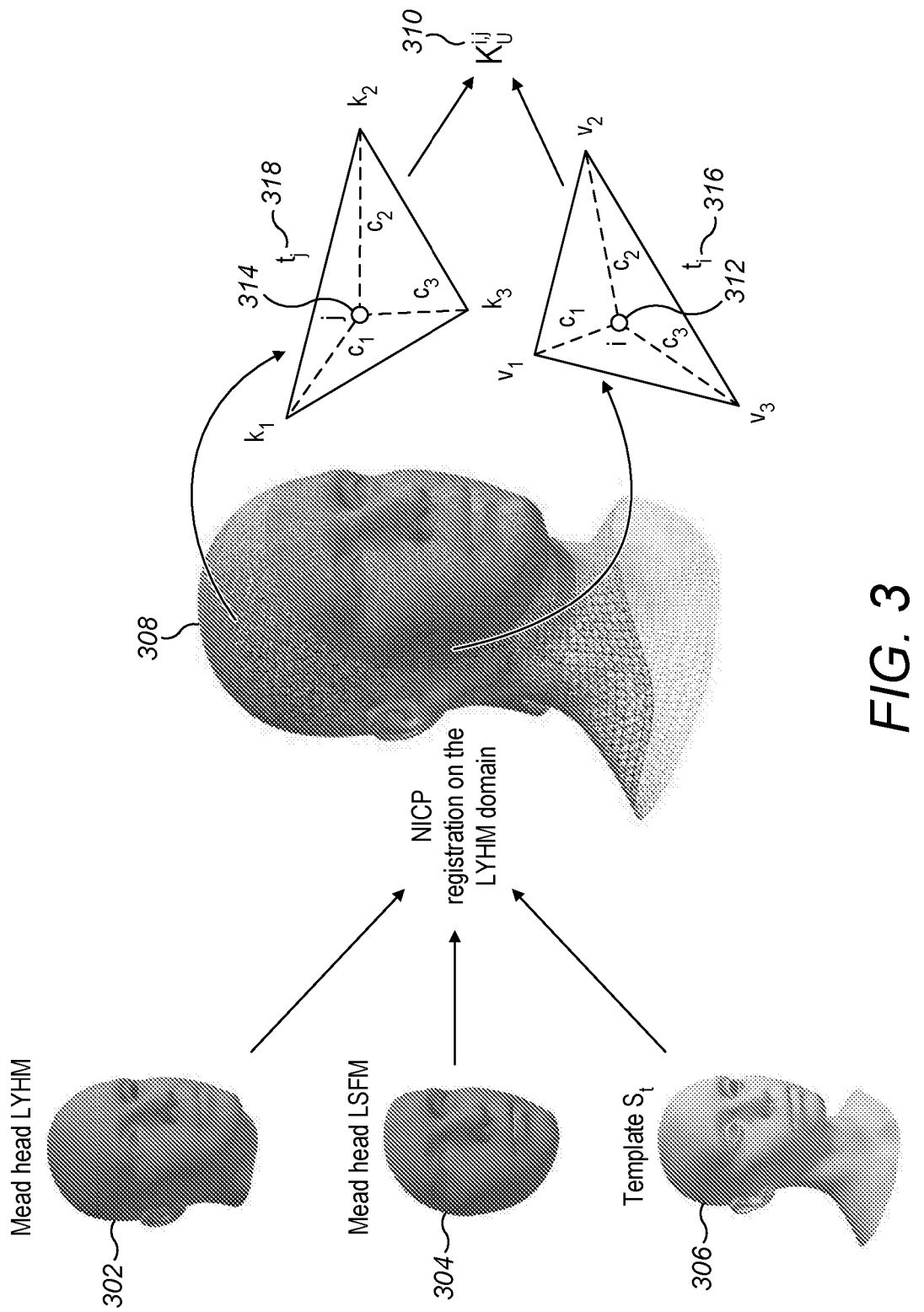
FIG. 3 shows an overview of a further method of generating three-dimensional morphable models by combining two known three-dimensional morphable models.

FIG. 3 shows an overview of a further method of generating three-dimensional morphable models by combining two known three-dimensional morphable models.

In some embodiments, the 3DMM may be a Gaussian Process Morphable model (GPMM). A GPMM is a generalisation of classical Point Distribution Models (such as those constructed using principal component analysis) that incorporates Gaussian processes. A shape, S, is modelled as a deformation from a reference shape, $S_R$, using:

$$S = \{x + u(x) | x \in S_R\} \quad (9)$$

where x is a point in the reference shape and u is a deformation function $u: \Omega \to \mathbb{R}^3$ with $\Omega \supseteq S_R$. The deformations are modelled as a Gaussian process $u \sim \mathcal{GP}(\mu, k)$, where $\mu: \Omega \to \mathbb{R}^3$ is the mean deformation and $k: \Omega \times \Omega \to \mathbb{R}^{3 \times 3}$ is a covariance function or kernel. The covariance function/kernel may be discretised as a covariance matrix. The covariance matrix, K, is a discrete approximation of the covariance function/kernel.

Given a first GPMM and a second GPMM that at least partially overlap, a new GPMM may be generated by combining the first and second GPMM by constructing a universal covariance matrix, $K_U$, from a covariance matrix, $K_1$, of the first GPMM and a covariance matrix, $K_2$, of the second GPMM. In the example shown, the first GPMM is a head model and the second GPMM is a facial model, though it will be appreciated that the method is applicable to the combination of 3DMM of any shape types.

The method 300 uses a mean shape of the first GPMM 302 (the first mean shape) and a mean shape of the second GPMM 304 (the second mean shape). The mean shape of the first GPMM 302 and the mean shape of the second GPMM 304 are registered using a registration process. An example of such a process is NICP registration. The first and second mean shapes 302, 304 may, in some embodiments, be converted to the same scale space before registration. A weighting scheme, such as the one described above in relation to FIG. 2, may be applied during the registration.

A template shape 306 is registered to the first mean shape 302 and the second mean shape 304. This may be performed as a separate step after generating the registration of the first mean shape 302 and the second mean shape 304, or as part of the same registration process. NICP registration may be used to register the head template 306 to the first mean shape 302 and the second mean shape 304. Together, the registered template shape, registered first mean shape and registered second mean shape form a registered model 308.

Following the creation of the registered model 308, the universal covariance matrix, $K_U$, is determined from the covariance matrices of the first GPMM and the second GPMM. The universal covariance matrix is determined by projecting pairs of points of the template shape 306 onto the mean shape of the first GPMM 302 and/or the mean shape of the second GPMM 304 using the registered model 308. A weighted sum of components of the covariance matrix of the first GPMM and/or components of the covariance matrix the second GPMM is used to determine the universal covariance matrix.

In some embodiments, the universal covariance matrix is determined from a plurality of local universal covariance matrices 310, $K_U^{i,j}$. For each of a plurality of pairs of points, (i,j), in the registered template shape, a local universal covariance matrix, $K_U^{i,j}$ may be calculated. The local universal covariance matrix may be calculated by projecting the points of each pair onto the registered mean shape of the first GPMM 302 and/or the registered mean shape of the second GPMM and blending local covariance matrices of the first GPMM 302 and/or local covariance matrices of the second GPMM 304 based on the projection.

In some embodiments, the projection involves determining barycentric coordinates 312, 314 of the points i and j in the registered first mean shape and/or the registered second mean shape. The barycentric coordinates may be taken with respect to triangles of mesh points 316, 318 in the registered first mean shape and/or the registered second mean shape. The barycentric coordinates may be used to blend local covariance matrices associated with the triangles of mesh points 316, 318 to for the local universal covariance matrices, as described below in relation to FIG. 4.

The universal covariance matrix is used to define a merged GPMM. In some embodiments, the merged GPMM undergoes a refinement process after combination of the first GPMM and the second GPMM, as described below in relation to FIGS. 5 and 6.

Figure 4:
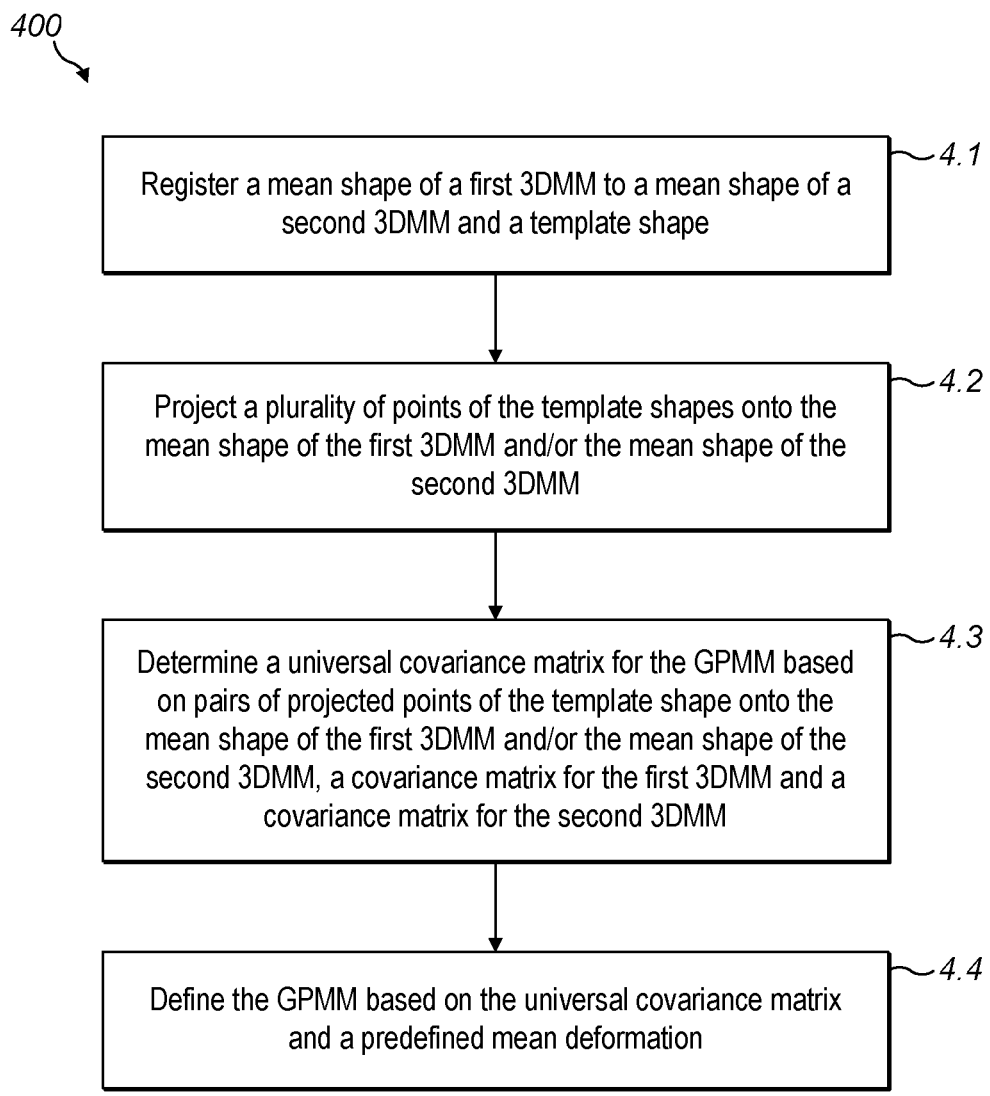
FIG. 4 shows a flow diagram of a further example method of generating three-dimensional morphable models by combining two known three-dimensional morphable models.

FIG. 4 shows a flow diagram of a further example method of generating three-dimensional morphable models by combining two known three-dimensional morphable models. The method 400 may be implemented on a computer. A Gaussian process morphable model, GPMM, is generated by combining a first 3DMM, with a second 3DMM. In the following, for convenience it will be assumed that the second 3DMM corresponds to a sub-region of the first 3DMM (for example the second 3DMM is a face model and the first 3DMM is a full head model). However, it will be appreciated that the opposite may be the case.

The first and/or second 3DMMs may be GPMMs defined by a mean deformation and a covariance function/kernel. In some embodiments, the first and/or second 3DMM is not in the form of a GPMM, and is converted into one by determining a covariance matrix corresponding to the covariance function/kernel.

For example, the principle orthonormal basis and eigenvalues of the first and/or second 3DMM may be used to determine a covariance matrix, for the 3DMM, using:

$$K_i = U_i \Lambda_i U_i^T \quad (10)$$

where $K_i \in \mathbb{R}^{3N_i \times 3N_i}$ is the covariance matrix of the $i^{th}$ model, $\Lambda_i \in \mathbb{R}^{n_i \times n_i}$ is a diagonal matrix of the of the first $n_i$ eigenvalues of the model and $U_i \in \mathbb{R}^{3N_i \times n_i}$ is a principle component matrix comprising the first $n_n$ principle components of the $i^{th}$ model that correspond to the $n_i$ eigenvalues in $\Lambda_1$.

At operation 4.1, a mean shape of the first 3DMM 302, a mean shape of the second 3DMM 304 and a template shape 306 are registered to each other. A registration method, such as NICP, is used to register these elements to each other.

In the example shown in FIG. 3, the first 3DMM is a head model, the second 3DMM is a face model and the template shape is a template head. The head model may, for example be the LYHM. The face model may, for example, be the LSFM. The head template may be a mesh of a reference head shape.

At operation 4.2, a plurality of points of the template shape onto the mean shape of the first 3DMM and/or the mean shape of the second 3DMM.

Points in the template shape are projected onto a mesh of the mean shape of the first 3DMM. If points of the template shape are projected onto a region of the mean shape of the first 3DMM that overlaps with the mean shape of the second 3DMM, then the points may additionally or alternatively be projected onto the mean shape of the second 3DMM. Any projection method known in the art may be used to perform these projections.

In some embodiments, the exact locations of the projected points in the mean shape of the first 3DMM and/or the mean shape of the second 3DMM are determined in terms of the barycentric co-ordinates with respect to triangles of mesh points in the respective mesh of the relevant mean shape. For the $i^{th}$ projected point, the barycentric coordinates ($c_1^i$, $c_2^i$, $c_3^i$) in the mean shape of the first 3DMM and/or the mean shape of the second 3DMM are identified with respect to a corresponding mesh triangle $t_i=[v_{i1}^T, v_{i2}^T, v_{i3}^T]$, where $v_{in}^T$ are the vertices of the mesh triangle.

At operation 4.3, a universal covariance matrix is determined for the GPMM based on pairs of projected points of the template shape onto the mean shape of the first 3DMM and/or the mean shape of the second 3DMM, a covariance matrix for the first 3DMM and a covariance matrix for the second 3DMM.

Given a pair of points in the template shape, (i,j), a local universal covariance matrix, $K_U^{i,j}$, may be determined based on the projections of the points (i,j) onto the mean shape of the first 3DMM and/or the mean shape of the second 3DMM. The local universal covariance matrix for each pair of points in the template shape is determined from the covariance matrices of the first and/or second 3DMMs. The local universal covariance matrices are combined to form a universal covariance matrix, $K_U$, that characterises the new/merged GPMM.

In some embodiments, for each pair of points, (i,j), in the template shape, it is determined whether the projection of the first point, i, and/or the second point, j, lies within the region in which the mean shape of the first 3DMM and the mean shape of the second 3DMM overlap.

If at least one of the points lies outside the region in which the mean shapes of the two 3DMMs overlap, then a local universal covariance matrix is determined based on the positions of the two points in the pair in the mean shape of the first model. In embodiments where the positions of the points are described in terms of barycentric coordinates with respect to triangles in the mesh of the mean shape, the local universal covariance matrix may be determined by taking a weighted sum of local covariance matrices between the vertices of the two triangles. The weights may be based on the respective barycentric coordinates of the two points, (i,j).

For example, let ($c_1^i,c_2^i,c_3^i$) be the barycentric coordinates of point i with respect to a triangle $t_i=[v_1^T,v_2^T,v_3^T]$, and ($c_1^j,c_2^j,c_3^j$) be the barycentric coordinates of point j with respect to a triangle $t_j=[k_1^T,k_2^T,k_3^T]$. Each vertex pair, (v,k), between the two triangles is associated with a local vertex-covariance matrix, $K_1^{v,k} \in \mathbb{R}^{3 \times 3}$, with $K_1^{v,k} \subseteq K_1$. The local covariance matrix for the pair may be determined by blending the local vertex-covariance matrices to create a blended local covariance matrix. for example a weighted sum of the local vertex-covariance matrices may be taken, such as:

$$K_U^{i,j} = \frac{\sum_{v=1}^3 \sum_{k=1}^3 w_{v,k}^{i,j} K_1^{v,k}}{\sum_{v=1}^3 \sum_{k=1}^3 w_{v,k}^{i,j}} \quad (11)$$

where $w_{v,k}^{i,j}$ are the weights. The weights may be a function of the barycentric coordinates of the points i and j. For example:

$$w_{v,k}^{i,j} = \frac{c_v^i + c_k^j}{2}. \quad (12)$$

If at least one of the points lies inside the region in which the mean shapes of the two 3DMMs overlap, then a local universal covariance matrix is determined based on the positions of the two points in the pair in the mean shape of the first model and the mean shape of the second model. In embodiments where the positions of the points are described in terms of barycentric coordinates with respect to triangles in the meshes of the first and second mean shapes, the local universal covariance matrix may be determined by taking a weighted sum of a blended local covariance matrix for the first 3DMM and a blended local covariance matrix for the second 3DMM:

$$K_U^{i,j} = \rho_{ij} K_1^{i,j} + (1-\rho_{ij}) K_2^{i,j} \quad (13)$$

where $\rho_{ij}=(\rho_i+\rho_j)/2$ is a normalised weight based on the positions $(\rho_i,\rho_j)$ of the points (i,j) with respect to a reference point of the registered meshes. $K_1^{i,j}$ and $K_2^{i,j}$ are blended covariance matrices for the first and second 3DMMs respectively. These may each be determined using the method described above in relation to the case where at least one of the points lies outside the region in which the mean shapes of the two 3DMMs overlap.

A local universal covariance matrix may determine for every pair of points in the template shape. These local covariance matrices are combined to form the full universal covariance matrix, which characterises the merged GPMM.

At operation 4.4 a merged GPMM is defined using the universal covariance matrix. For example, using the template shape, $S_t$, and the universal covariance matrix, $K_U$, a covariance function/kernel for points x and y may be defined as:

$$k_U(x,y) = K_U^{CP(S_t,x), CP(S_t,y)} \quad (14)$$

where $CP(S_t,x)$ is a function that returns the index of the closest point to x on the template shape. The mean deformation, $\mu_U$, may be set to a pre-defined value, such as a zero vector. The merged GPMM is therefore defined as:

$$\mathcal{GP}\,(\mu_U, k_U). \quad (15)$$

Any other method for defining and/or approximating a GPMM from the universal covariance matrix may alternatively be used.

Figure 5:
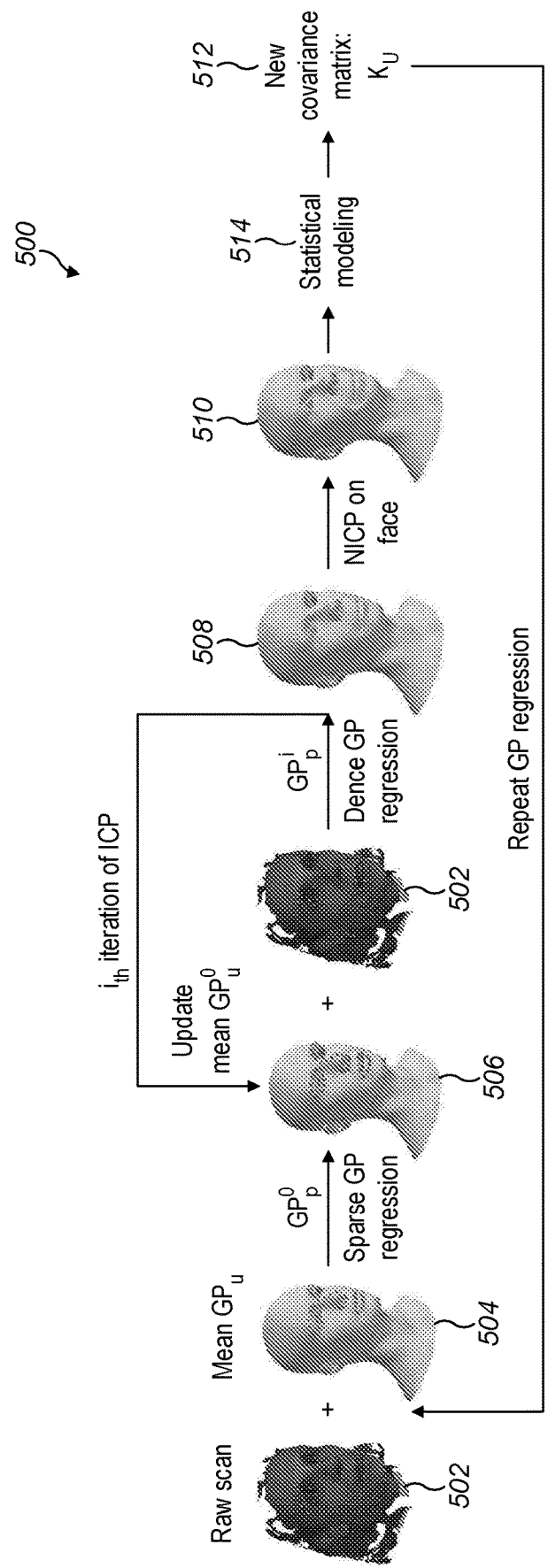
FIG. 5 shows an overview of a method of refining a generated three-dimensional morphable model.

FIG. 5 shows an overview of a method of refining a generated GPMM. Following generation of a merged GPMM using the methods of FIGS. 3 and 4, a refinement process 500 may be applied to refine the merged GPMM. The refinement process comprises the use of Gaussian process regression to determine a refined GPMM from the merged GPMM and one or more raw scans.

The merged GPMM may be used to generate a plurality of shapes that correspond to the subject of the first 3DMM (such as, for example, full head shapes) from a plurality of shapes that correspond to the subject of the second 3DMM (such as, for example, faces). Gaussian process regression may be used to generate the plurality of first shapes. Given a set of observed deformations, X, subject to Gaussian noise $\epsilon \sim \mathcal{N}(0,\sigma^2)$, Gaussian process regression computes a posterior model:

$$\mathcal{GP}_p(\mu_p, k_p) = \text{posterior}(\mathcal{GP}, X) \quad (16)$$

from a current model $\mathcal{GP}$ (μ,k). The mean, $μ_p$, and covariance, $k_p$, may be computed using:

$$μ_p(x)=μ(x)+K_X(x)^T(K_{XX}+σ^2I)^{-1}X \quad (17)$$

and $$k_p(x,x')=k(x,x')-K_X(x)^T(K_{XX}+σ^{-2}I)^{-1}K_X(x). \quad (18)$$

where $$K_X(x)=(k(x,x_i)), \forall x_i \in X \quad (19)$$

and $$K_{XX}=(k(x_i,x_j)), \forall x_i,x_j \in X. \quad (20)$$

The refinement method 500 uses as input one or more scans of a 3D object (herein also referred to as a "raw scan") 502 and a reference shape GPMM 504. The input scans 502 correspond to a subset of the reference shape 504. For example, in the example shown in FIG. 5, the reference shape 504 is a full head, and the input scan 502 is a face.

Each input scan 502, S, comprises a plurality of points. One or more sets of points may be used to define one or more landmarks of the input scan, $L_s=\{l_1, \ldots l_n\}$. The reference shape 504, $S_t$, comprises a plurality of points. One or more sets of points may be used to define one or more landmarks of the reference shape, $L_{St}=\{l_1, \ldots l_m\}$. The reference shape 504 may, for example, be the mean shape of the merged GPMM.

Given one or more input scans 502 and a reference shape 504, an initial posterior model is determined based on sparse deformations defined by corresponding landmarks in the mean shape 504 and the input scans 502. For example, the initial posterior model may be defined using:

$$\mathcal{GP}_p^0(μ_p,k_p)=\text{posterior}(\mathcal{GP}_U,L_S-L_{St}) \quad (21)$$

where $\mathcal{GP}_U$ is the merged GPMM. The posterior GPMM defines a new mean shape 506 of the GPMM. The new mean shape 506 may be used to define a new mean deformation from the reference model.

The posterior model is then iteratively refined, for example using an iterative closest point algorithm. At each iteration, i, a current regression result, $S^i_{reg}$, is determined from the reference shape and the mean deformation of the posterior model at the previous iteration. For each point, x, in the reference shape the current registration may be determined using $$S_{reg}^i=\{x+μ_p^{i-1}(x)|x \in S_t\}, \quad (22)$$

where $μ_p^{i-1}(x)$ is the mean deformation of the posterior model at the previous iteration. This can be thought of as the reference shape 504 wrapped with the mean deformation of the posterior model of the previous iteration of the refinement.

For each point of the current regression result, a closest point, $U^i$, on the input scan 502 is determined. The difference between these points and the corresponding points on the current regression result is used to determine an updated GPMM. For example, the updated GPMM may be determined using:

$$\mathcal{GP}_p^{i+1}(μ_p^{i+1},k_p^{i+1})=\text{posterior}(\mathcal{GP}_p^0,U^i-S_{reg}^i). \quad (23)$$

After a threshold number of iterations, a final regression result 508, $S_{reg}$, is obtained.

The region of the final regression result 508 corresponding to the input scan 502 (for example, the facial region of the final regression result 508 if the input scan 502 is a full head) is then non-rigidly aligned to the input scan 502 to obtain reconstructed shape 510. A new sample covariance matrix 512 is then determined using the reconstructed shape 510.

In some embodiments, the reconstructions obtained by the aforementioned method may produce unrealistic 3D shapes. The covariance matrix may be modified before the Gaussian process regression in order to reduce this effect. The modification comprises computing principal components by decomposing the covariance matrix. The modification further comprises reconstructing the covariance matrix with fewer statistical components, for example using equation 10, but with fewer statistical components.

In some embodiments, the process may be performed with a plurality of input scans 502 to determine a plurality of reconstructed scans 510. Statistical modelling 514 may be used to determine the new sample covariance matrix 512.

The Gaussian process regression may be repeated with the new sample covariance matrix in order to refine the reconstructed shapes. A refined model may be determined by performing principle component analysis on the refined reconstructed shapes.

Figure 6:
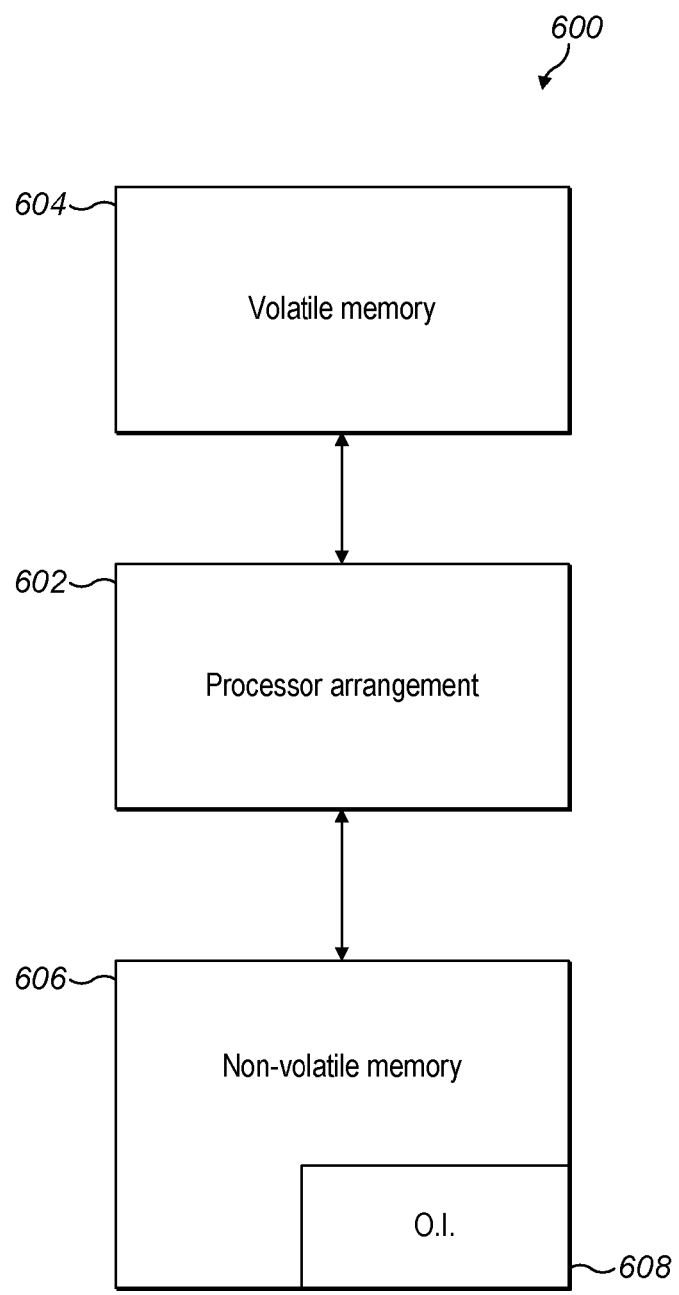
FIG. 6 shows a schematic example of a system/apparatus for performing any of the methods described herein.

FIG. 6 shows a schematic example of a system/apparatus for performing any of the methods described herein. The system/apparatus shown is an example of a computing device. It will be appreciated by the skilled person that other types of computing devices/systems may alternatively be used to implement the methods described herein, such as a distributed computing system.

The apparatus (or system) 60o comprises one or more processors 602. The one or more processors control operation of other components of the system/apparatus 600. The one or more processors 602 may, for example, comprise a general purpose processor. The one or more processors 602 may be a single core device or a multiple core device. The one or more processors 602 may comprise a central processing unit (CPU) or a graphical processing unit (GPU). Alternatively, the one or more processors 602 may comprise specialised processing hardware, for instance a RISC processor or programmable hardware with embedded firmware. Multiple processors may be included.

The system/apparatus comprises a working or volatile memory 604. The one or more processors may access the volatile memory 604 in order to process data and may control the storage of data in memory. The volatile memory 604 may comprise RAM of any type, for example Static RAM (SRAM), Dynamic RAM (DRAM), or it may comprise Flash memory, such as an SD-Card.

The system/apparatus comprises a non-volatile memory 606. The non-volatile memory 606 stores a set of operation instructions 608 for controlling the operation of the processors 602 in the form of computer readable instructions. The non-volatile memory 606 may be a memory of any kind such as a Read Only Memory (ROM), a Flash memory or a magnetic drive memory.

The one or more processors 602 are configured to execute operating instructions 408 to cause the system/apparatus to perform any of the methods described herein. The operating instructions 608 may comprise code (i.e. drivers) relating to the hardware components of the system/apparatus 600, as well as code relating to the basic operation of the system/apparatus 600. Generally speaking, the one or more processors 602 execute one or more instructions of the operating instructions 608, which are stored permanently or semi-permanently in the non-volatile memory 606, using the volatile memory 604 to temporarily store data generated during execution of said operating instructions 608.

Implementations of the methods described herein may be realised as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 6, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

The invention claimed is:

1. A method comprising:
   obtaining a first three-dimensional morphable model (3DMM);
   calculating a mapping from a plurality of second parameters of a second 3DMM to a plurality of first parameters of the first 3DMM;
   generating, using the second 3DMM, a plurality of second shapes;
   generating, for each of the second shapes, a corresponding first shape using the first 3DMM;
   forming a plurality of merged shapes by merging each of the second shapes with the corresponding first shape; and
   performing a principal component analysis on the merged shapes to generate a new 3DMM.

2. The method of claim 1, further comprising:
   generating, using the first 3DMM, a third shape for a first object; and
   generating, using the second 3DMM, a fourth shape for a second object, wherein a first portion of the first object overlaps with a second portion of the second object.

3. The method of claim 2, wherein the first object is a head, and wherein the second object is a face or an ear.

4. The method of claim 2, wherein the fourth shape comprises a higher resolution than the third shape.

5. The method of claim 1, wherein, for each of the corresponding first shapes, the method further comprises:
   determining a set of second parameters describing a third shape corresponding to a portion of the corresponding first shape;
   determining a set of first parameters describing the portion; and
   calculating a regression matrix for mapping a plurality of sets of second parameters onto one of the first parameters.

6. The method of claim 5, further comprising:
   constructing a first shape matrix comprising the corresponding sets of first parameters;
   constructing a second shape matrix comprising the sets of second parameters; and
   calculating the regression matrix by minimizing:

$$\|C_h - W_{h,f} C_f\|^2,$$

wherein $C_h$ represents the first shape matrix, wherein $C_f$ represents the second shape matrix, and wherein $W_{h,f}$ represents the regression matrix.

7. The method of claim 5, further comprising registering the corresponding first shape with a mean shape of the second 3DMM.

8. The method of claim 1, further comprising:
   discarding a region of the corresponding first shape corresponding to each of the second shapes; and
   applying a non-rigid registration between each of the second shapes and the corresponding first shape.

9. The method of claim 8, further comprising assigning a stiffness weight to points on each of the second shapes based on a distance from a central point of each of the second shapes.

10. An apparatus comprising:
    one or more processors; and
    a memory coupled to the one or more processors and configured to store computer readable instructions that, when executed by the one or more processors, cause the apparatus to:
    obtain a first three-dimensional morphable model (3DMM);
    calculate a mapping from a plurality of second parameters of a second 3DMM to a plurality of first parameters of the first 3DMM;
    generate, using the second 3DMM, a plurality of second shapes;
    generate, for each of the second shapes, a corresponding first shape using the first 3DMM;
    form a plurality of merged shapes by merging each of the second shapes with the corresponding first shape; and
    perform a principal component analysis on the merged shapes to generate a new 3DMM.

11. The apparatus of claim 10, wherein the computer readable instructions, when executed by the one or more processors, further cause the apparatus to:
    generate, using the first 3DMM, a third shape for a first object; and
    generate, using the second 3DMM, a fourth shape for a second object,
    wherein a first portion of the first object overlaps with a second portion of the second object.

12. A computer program product comprising instructions stored on a non-transitory computer-readable medium that, when executed by one or more processors, cause an electronic device to:
    obtain a first three-dimensional morphable model (3DMM);
    calculate a mapping from a plurality of second parameters of a second 3DMM to a plurality of first parameters of the first 3DMM;
    generate, using the second 3DMM, a plurality of second shapes;
    generate, for each of the second shapes, a corresponding first shape using the first 3DMM;
    form a plurality of merged shapes by merging each of the second shapes with the corresponding first shape; and perform a principal component analysis on the merged shapes to generate a new 3DMM.

13. The computer program product of claim 12, wherein the one or more processors are further configured to execute the instructions to cause the electronic device to:
generate, using the first 3DMM, a third shape for a first object; and
generate, using the second 3DMM, a fourth shape for a second object, wherein a first portion of the first object overlaps with a second portion of the second object.

14. The computer program product of claim 13, wherein the first object is a head, and wherein the second object is a face or an ear.

15. The computer program product of claim 13, wherein the fourth shape comprises a higher resolution than the third shape.

16. The computer program product of claim 12, wherein, for each of the corresponding first shapes, the one or more processors are further configured to execute the instructions to cause the electronic device to:
determine a set of second parameters describing a third shape corresponding to a portion of the corresponding first shape;
determine a set of first parameters describing the portion; and
calculate a regression matrix for mapping a plurality of sets of second parameters onto one of the first parameters.

17. The computer program product of claim 16, wherein the one or more processors are further configured to execute the instructions to cause the electronic device to:
construct a first shape matrix comprising the corresponding sets of first parameters;
construct a second shape matrix comprising the sets of second parameters; and
calculate the regression matrix by minimizing:

$$\|C_h - W_{h,f} C_f\|^2,$$

wherein $C_h$ represents the first shape matrix, wherein $C_f$ represents the second shape matrix, and wherein $W_{h,f}$ represents the regression matrix.

18. The computer program product of claim 16, wherein the one or more processors are further configured to execute the instructions to cause the electronic device to register the corresponding first shape with a mean shape of the second 3DMM.

19. The computer program product of claim 12, wherein the one or more processors are further configured to execute the instructions to cause the electronic device to:
discard a region of the corresponding first shape corresponding to each of the second shapes; and
apply a non-rigid registration between each of the second shapes and the corresponding first shape.

20. The computer program product of claim 12, wherein the one or more processors are further configured to execute the instructions to cause the electronic device to assign a stiffness weight to points on each of the second shapes based on a distance from a central point of each of the second shapes.

* * * * *